Patented Mar. 26, 1929.

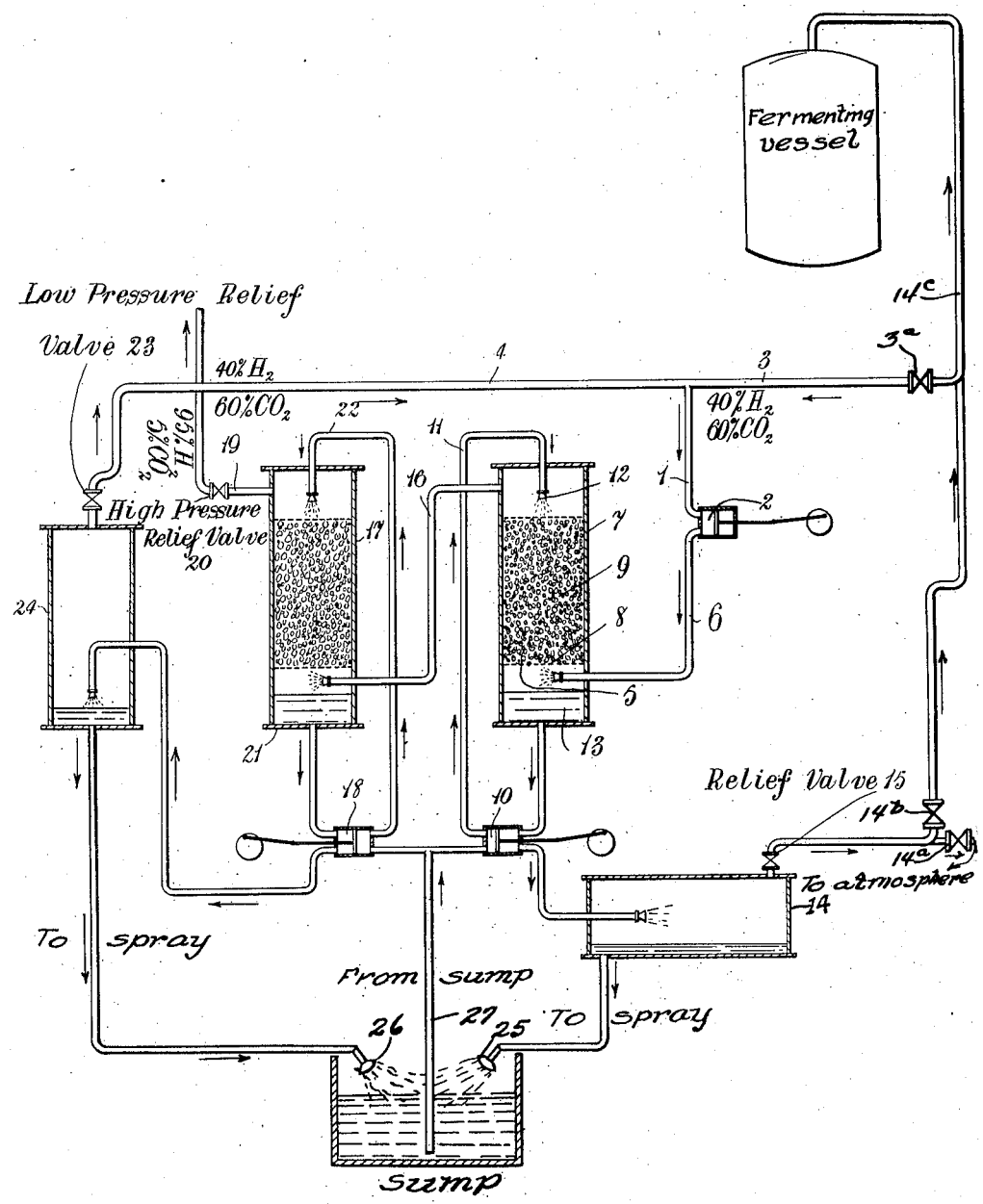

1,706,707

UNITED STATES PATENT OFFICE.

JOSEPH REILLY, OF CORK, IRELAND, AND ETHELBERT WILLIAM BLAIR, OF PARKSTONE, ENGLAND, ASSIGNORS TO COMMERCIAL SOLVENTS CORPORATION, OF NEW YORK, N. Y., A CORPORATION OF MARYLAND.

PROCESS FOR THE SEPARATION OF GASES.

Application filed April 8, 1925. Serial No. 21,475.

This invention relates to the separation of gases, for example those produced during the processes of fermentation, particularly of carbohydrates.

The separation of one gas from another by treatment with a liquid by which one is almost completely absorbed, and the other practically not at all, is a frequent operation both technically and in the laboratory. Such absorptions, however, are generally chemical, and proceed almost independently of the changing partial pressures of the gases which are being treated. On the other hand the use of liquids in which one gas is much more soluble without chemical action than the other is infrequent, principally because the law of partial pressures renders it impossible completely to separate two gases in this way.

The preent invention is concerned mainly with the latter method.

Now we have found that fermentation gases, particularly those produced by the fermentation of carbohydrates, as for example starchy bodies, are peculiarly susceptible to treatment of this kind.

The fermentation gases which may consist almost entirely of hydrogen and carbonic acid gas, are passed in counter-current under pressure through devices adapted to secure thorough intermingling with a selective solvent liquid. The liquid and gases are then separated and the dissolved gas released from the liquid in a separate vessel.

Experiment has shown that efficient washing in a single scrubbing device or tower may be attained up to a 90% hydrogen gas. The attainment of such a high figure with almost the theoretical quantity of solvent liquid is due not only to the ready solubility of carbon dioxide under the conditions employed and to the great difference between its solubility and the solubility of hydrogen, but also to the fact that hydrogen dissolved by the solvent liquid towards the top of the scrubbing device is partly removed from solution by the gas lower down, owing to the lower partial pressure of the hydrogen in the later, and so there is a constant stream of such recovered hydrogen up the scrubbing device besides the hydrogen not dissolved at any stage, all tending to bring the gas towards the required percentage.

It has been found that an improvement on washing by a single mixing device is effected by less thorough washing in a first mixing device and passing the undissolved gases through a second mixing device, the dissolved gas from the second device being separated from the solution and recirculated through the first device. This dissolved gas is made to approximate the composition of the initial gas by suitable regulation of the gas and liquid flow in the respective mixing devices.

In some cases more than two mixing devices are desirable but the gases recovered from the resulting solutions should be returned to the circulation at suitably chosen points where the composition of the gases being treated is similar.

The treatment liquid or liquids should be chosen as selectively dissolving one or more of the constitutent gases.

We have found that water or an organic liquid, such as acetone, is suitable as the selective solvent.

When using more than one mixing device different liquids may be used in the different scrubbers, e. g., water in one and acetone in another.

Again a reacting liquid, such as lime water, may be used in one or more of the mixing devices.

The present invention consists in a process for the separation of gases, for example the hydrogen and carbon dioxide gases produced by the fermentation of carbohydrates, wherein the gases are passed in counter-current, under increased pressure, through a scrubbing device adapted to secure thorough intermingling of the gases with the liquid, collection of the undissolved gases and preferably with recovery of one or more of the dissolved gases from the solution.

The invention also consists in a process for the separation of gases, for example the hydrogen and carbon dioxide gases produced by the fermentation of carbohydrates, which consists in compressing the mixed gases to a predetermined value and washing them while under pressure in a plurality of scrubbing devices through which the gases are passed in series.

The invention also consists in a process for the separation of gases, for example the hydrogen and carbon dioxide gases produced by the fermentation of carbohydrates, which consists in compressing the mixed gases to a predetermined value, washing them while under pressure in a plurality of scrubbing devices arranged in series and varying the quantities and percentage compositions of the gas dissolved in the respective scrubbing devices by adjusting the ratio of solvent liquid to gas passing through the individual scrubbing devices so as to return a gas of proper composition from the expanded solvent liquid from the second scrubbing device to the first scrubbing device.

The invention also consists in a process for the separation of gases, for example the hydrogen and carbon dioxide gases produced by the fermentation of carbohydrates, which consists in compressing the mixed gases to a predetermined value, washing them while under pressure in a plurality of scrubbing devices arranged in series, varying the quantities and percentage compositions of the gas dissolved in the respective scrubbing devices by adjusting the ratio of solvent liquid to gas passing through the individual scrubbing devices so as to return a gas of proper composition from the expanded solvent liquid from the second scrubbing device to the first scrubbing device, and arranging that the percentage composition of the gas dissolved in the solvent liquid issuing from the last scrubbing device of the series is substantially the same as that of the original gas.

The invention also consists in a process for the separation of gases, for example the hydrogen and carbon dioxide gases produced by the fermentation of carbohydrates, which consists in compressing the mixed gases to a predetermined value, washing them while under pressure in a plurality of scrubbing devices arranged in series, varying the quantities and percentage compositions of the gas dissolved in the respective scrubbing devices by adjusting the ratio of solvent liquid to gas passing through the individual scrubbing devices so as to return a gas of proper composition from the expanded solvent liquid from the second scrubbing device to the first scrubbing device, arranging that the percentage composition of the gas dissolved in the solvent liquid issuing from the last scrubbing device of the series is substantially the same as that of the original gas and recirculating the gas contained in said last solvent liquid through the said series of scrubbing devices.

The invention further consists in a process for the separation of gases, for example the hydrogen and carbon dioxide gases produced by the fermentation of carbohydrates, which consists in compressing the mixed gases to a predetermined value, washing them while under pressure in a plurality of scrubbing devices through which the gases are passed in series and maintaining the temperature of both solvent liquid and gases at a temperature not exceeding 20° C.

The invention will now be described with reference to the accompanying drawing as applied to the separation of the hydrogen and carbon dioxide produced during the fermentation of maize starch.

In practice it is found that 100 lb. of maize (containing 65% of starch) gives approximately 7 lb. of acetone, 16.3 of $n$-butyl alcohol, 39 of carbon dioxide, 0.9 of carbon dioxide (in solution), 1.1 of hydrogen, and 1.2 of fatty acids. The carbon dioxide formed is equivalent to about 350 cubic feet at 20° and 760 mm., while the hydrogen is equivalent to slightly over 200 cubic feet under the same conditions; or expressed on starch utilized, 100 parts by weight of starch gives 10.7 parts of acetone, 25.1 of $n$-butyl alcohol, 61.4 of carbon dioxide, 1.6 of hydrogen, and 1.8 of fatty acids. It will thus be seen that the greater portion of the carbohydrate is changed into gaseous products which are usually allowed to go to waste.

Carbon dioxide dissolves to a much greater extent than hydrogen, and the gas leaving the second scrubber we found had the composition hydrogen 95% and carbon dioxide 5% as compared 40% $H_2$, 60% $CO_2$ for the original mixture of gases from the fermenting vessel. To economize water the gas in the scrubbers was washed at an approximate pressure of 11 atmospheres which we found to be most economical for the volume of gas under treatment. A low temperature increases the solubility of the gas; the temperature employed was about 15° C. The solubility of hydrogen in water under various pressures at 15° C. very closely follows Henry's law; at ordinary pressures and temperature hydrogen has about $\frac{1}{50}$th of the corresponding solubility of carbon dioxide.

The advantage of separating and collecting the gaseous products is apparent, since on a large scale with fermentations using 30 tons of maize as much as 295,000 cubic feet of gas is evolved in 36 hours. The storing of all this gas would be a difficulty, but by treating it as described some 80,000 cubic feet of practically pure hydrogen could be obtained, it being assumed that the first 90,000 cubic feet of fermantation gas which is contaminated with air is useless. The loss of this 90,000 cubic feet is preferably avoided by filling the fermenting vessels prior to fermentation with carbon dioxide as produced from our separating processes herein set forth. This throws more work on the separating plant, but economically it is worth while, since the first gas evolved in the fermentation contains, if uncontaminated, 60% of hydrogen owing to carbon dioxide dissolving in the mash. After 11 hours the mash is saturated and we then get the 40% hydrogen gas, the treatment of which will be hereinafter described.

The drawing represents diagrammatically a plant for carrying out the process according to the invention.

The mixed gases which are assumed to contain by volume 40% hydrogen and 60% carbon dioxide enter the compressor 2 from the pipe 1. The pipe 1 is supplied from the pipe 3 from the fermenting vessel controlled by the valve 3$^a$ and also from the pipe 4, the function of which will be hereinafter described.

The compressor delivers the gases at a pressure about 11 atmospheres to a spray nozzle 5 through the pipe 6.

This nozzle 5 is situated near the bottom of a scrubbing device 7 and beneath a perforated partition 8 supporting a mass of ring and star packing 9.

The gass passes up through the packing 9, meeting a downward stream of water provided (at a pressure about 50 lb. per square inch higher than the gas pressure of 11 atmospheres) by a pump 10 through a pipe 11 and a spraying nozzle 12. The pump 10 also serves to pump the solvent liquid from the base 13 of the scrubbing device 7 to a break-down tank 14 closed to atmosphere which acts as a reservoir for the carbon dioxide water pumped from the scrubber 7. The release of pressure in the tank 14 causes this gas to go out of solution and is discharged through a relief valve 15 set at any desired pressure and stored or utilized in any desired manner, for example, through the valve 14$^a$ to atmosphere, or through the valve 14$^b$ by which the carbon dioxide may be passed upwardly through the pipe 14$^c$ to the fermenting vessel as we have hereinbefore described. Such gas is practically pure $CO_2$ because of the high concentration of $CO_2$ in the gas mixture from the fermenter.

After passing through the scrubber 7 the remaining gas has a percentage composition of 85% hydrogen to 15% carbon dioxide and the gas discharged through the relief valve 15 contains 0.9 per cent of hydrogen—representing the total loss of hydrogen during the whole of the process according to the present invention. The amount of water flowing down the scrubber 7 should be properly adjusted to about one cubic foot of water to ten cubic feet of gas entering through the pipe 6 if the gas passing out of the scrubber 7 through the pipe 16 is to have the composition 85% $H_2$ and 15% $CO_2$.

The remaining gas leaving the scrubber 7 by the pipe 16 is passed in a similar manner through a scrubber 17 supplied with solvent liquid from a second pump 18 and pipe 22 and emerges from the pipe 19 at the top of the scrubber 17 through a high pressure release valve 20 as purified gas of the composition 95% hydrogen to 5% carbon dioxide.

The solvent liquid from the base 21 of the scrubbing device 17 is pumped by the pump 18 to the break-down tank 24, the pressure reduced and the released gas having the composition 40% hydrogen to 60% carbon dioxide is led off through the low pressure relief valve 23 through the pipe 4 to the compressor feed pipe 1.

The solvent liquid from the two break-down tanks 14 and 24 is led through spraying nozzles 25 and 26 respectively to a sump which continuously provides the feed water for the pumps 10 and 18 through the pipe 27.

It is impossible to wash in a single scrubbing device to 100% hydrogen owing to the decrease in the partial pressure of carbon dioxide as the percentage present falls.

If each 100 cubic feet of 40% hydrogen gas be treated with the quantity of solvent liquid required according to theory to wash to 100% hydrogen gas, it will be found that the solvent liquid flowing away never comes quite into equilibrium with the entering gas.

The quantities of solvent liquid required in the second scrubbing device for obtaining gas containing up to 90% of hydrogen can only be accurately forecast from theory when the entering gas is not above 80% hydrogen. The decreasing solubility of carbon dioxide makes its effect more felt when the solvent liquid flowing away is in equilibrium with a rich hydrogen gas, and it is found more difficult to obtain equilibrium.

The discrepancy between practice and theory above 90% hydrogen exit gas is very noticeable. The large increase in the volume of solvent liquid used means that a great loss in hydrogen occurs if it be attempted to wash to over a 90% hydrogen gas. The loss may be prevented by using two scrubbing devices and returning the gas, which comes out of solution on releasing the pressure on the solvent liquid flowing from the second scrubbing device, to be re-washed in the first scrubbing device.

In doing this it is best arrange the washings so that the gas dissolved in the solvent liquid flowing from the second scrubbing device had the composition of 40% $H_2$, 60% $CO_2$. Theoretically it is not possible to achieve this since the gas dissolved in solvent liquid in equilibrium with a 95% gas contains only 25% of hydrogen. But practically it has been found that with an 85% hydrogen gas between the scrubbing devices, and using the same quantity of solvent liquid in both scrubbing devices, the gas dissolved in the solvent liquid flowing from the second scrubbing device had the required composition and the gas issuing from the second scrubbing device contained 95% of hydrogen.

The following statement will illustrate the ratio of water to gas we employed in the two scrubbers 7 and 17. The quantity of water used in the first scrubber 7 per 100 cubic feet at one atmosphere and 15° C. of entering 40% hydrogen and 60% carbon dioxide gas was in theory 9.3 cubic feet, while in practice we found that 9.5 cubic feet was needed. However in the second scrubber the quantity of water used was some three times that required on theory to obtain the percentage composition hereinbefore set forth.

Having now described our invention, what we claim as new and desire to secure by Letters Patent is:—

1. The process for continuously separating a mixture of hydrogen and carbon dioxide, such as fermentation gas, which comprises compressing the raw gas, washing same with a solvent liquid under pressure to remove a greater part of the carbon dioxide, then washing the residual gas under pressure to remove substantially all the carbon dioxide, then releasing the pressure on the solvent liquid to recover the dissolved hydrogen-bearing gas, and returning the latter to the raw gas under compression.

2. The process for continuously separating a mixture of hydrogen and carbon dioxide, such as fermentation gas, which comprises compressing the raw gas, washing same with a solvent liquid under pressure to remove a greater part of the carbon dioxide, then releasing the pressure on said solvent liquid to recover substantially pure carbon dioxide, then washing the residual gas under pressure to remove substantially all the carbon dioxide, then releasing the pressure on the solvent liquid to recover the dissolved hydrogen-bearing gas, and returning the latter to the raw gas under compression.

3. The process for continuously separating a mixture of hydrogen and carbon dioxide, such as fermentation gas, by washing in successive stages, which consists first in washing the raw gas with a solvent liquid under pressure to remove a greater part of the carbon dioxide, and secondly in washing the residual gas under pressure to remove substantially all the carbon dioxide, the dissolved gas from the first stage being recovered as substantially pure carbon dioxide while the dissolved gas from the second stage is returned to said raw gas in the first stage.

4. In the separation of hydrogen and carbon dioxide obtained in pure form from a butyl fermentation vessel, the steps which consist in washing the air-free gas with a solvent liquid under pressure, then releasing the pressure on said solvent liquid to recover carbon dioxide, and returning part of the recovered carbon dioxide to the fermentation vessel to maintain an anaërobic atmosphere therein.

5. In the separation of the mixed hydrogen and carbon dioxide gases evolved in pure form from butyl fermentations, the steps which consist in washing the said fermentation gases with a solvent liquid under pressure to remove carbon dioxide, then releasing the pressure on the solvent liquid to recover carbon dioxide, and returning part of said carbon dioxide to the fermentation vessel during draining to maintain an anaërobic atmosphere therein.

In testimony whereof we have signed our names to this specification.

JOSEPH REILLY.
ETHELBERT WILLIAM BLAIR.